United States Patent [19]
Dunfield et al.

[11] Patent Number: 5,956,204
[45] Date of Patent: Sep. 21, 1999

[54] MAGNETIC DISC DRIVE HAVING MAGNETIC PARTICLE TRAP FOR HYDRODYNAMIC BEARING

[75] Inventors: John Charles Dunfield, Santa Cruz; Norbert Steven Parsoneault, Watsonville, both of Calif.

[73] Assignee: Seagate Technology, Inc., Scotts Valley, Calif.

[21] Appl. No.: 08/387,463

[22] Filed: Feb. 13, 1995

[51] Int. Cl.⁶ .............................. G11B 17/02; F16C 32/06; B01D 35/06; F01M 1/10
[52] U.S. Cl. ...................................... 360/98.07; 360/99.08; 384/107; 384/113; 384/446; 210/222; 210/695; 184/6.25
[58] Field of Search .............................. 360/97.01, 98.01, 360/98.07, 98.08, 99.04, 99.08–99.12; 384/107, 112–115, 123, 130, 133, 291, 292, 446; 210/222, 223, 695; 184/6.24, 6.25

[56] References Cited

U.S. PATENT DOCUMENTS

| | | | |
|---|---|---|---|
| 3,283,905 | 11/1966 | Cass ........................................ | 184/6.25 |
| 3,800,914 | 4/1974 | Miyata .................................... | 184/6.25 |
| 4,440,402 | 4/1984 | Pinkus et al. ............................. | 277/80 |
| 4,630,943 | 12/1986 | Stahl et al. ............................... | 384/446 |
| 4,673,997 | 6/1987 | Gowda et al. ............................ | 360/107 |

(List continued on next page.)

FOREIGN PATENT DOCUMENTS

| | | | |
|---|---|---|---|
| 4-78315 | 3/1992 | Japan ..................................... | 384/446 |

OTHER PUBLICATIONS

S. Prina and C. Taft, "The Design and Analysis of Brushless DC Motors Having Smooth Rotor Back Iron", pp. 75–100 (undated) No Date.

DC Motors Speed Controls Servo Systems, "Brushless DC Motors", Electro–Craft Corporation, Hopkins, MN, Chapter 6, pp. 6–5–6–17 Oct. 1972.

C. Veinott, *Theory and Design of Small Induction Motors*, "Air–Gap MMF and Flux Waves Set Up By A Single–Phase Winding", published by McGraw–Hill Company, Inc., New York, Chapter 14, pp. 265–281 (1959) No Month.

C. Veinott, *Theory and Design of Small Induction Motors*, "Air–Gap MMF Waves Set Up By A Stator Winding", published by McGraw–Hill Company, Inc., New York, Chapter 15, pp. 282–290 (1959) No Month.

A.E. Fitzgerald, C. Kingsley, Jr. and S. Umans, *Fourth Edition—Electric Machinery*, "Rotating Machines: Basic Concepts", published by McGraw–Hill Company, Inc., New York, pp. 133–135 (1983) No Month.

T.H. Barton, J.C. Dunfield, *IEEE Transactions on Power Apparatus and Systems*, "Inductances of a Practical Slip–Ring Primitive", IEEE, vol. PAS–85/No. 2, pp. 140–159 (Feb. 1966).

J.C. Dunfield, T.H. Barton, *Proceedings of The Institution of Electrical Engineers*, "Effect of m.m.f. and permeance harmonics in electrical machines—with special reference to a synchronous machine", The Inst. of Elect. Eng., Savoy Place, London, WC2, vol. 114, No. 10, pp. 1443–1450 (Oct. 1967).

*Primary Examiner*—Jefferson Evans
*Attorney, Agent, or Firm*—Westman, Champlin & Kelly, P.A.

[57] ABSTRACT

A magnetic disc drive system includes a hydrodynamic bearing. The magnetic disc drive system includes a disc drive chassis, a magnetic storage disc, and a read/write transducer adjacent to the disc for reading and writing information on the disc. The hydrodynamic bearing assembly rotatably couples the magnetic storage disc to the disc drive chassis. The hydrodynamic bearing assembly includes a fluid path therethrough for circulating a fluid. A permanent magnet is placed in the fluid path and used for attracting magnetic particles carried in the fluid.

12 Claims, 9 Drawing Sheets

5,956,204
Page 2

U.S. PATENT DOCUMENTS

| | | | |
|---|---|---|---|
| 4,759,842 | 7/1988 | Frees et al. | 210/94 |
| 4,779,165 | 10/1988 | Elsaesser et al. | 360/97 |
| 4,784,767 | 11/1988 | Hasuda et al. | 210/222 |
| 4,851,116 | 7/1989 | Tomita | 184/6.25 |
| 4,934,836 | 6/1990 | Tanaka et al. | 384/107 |
| 4,938,611 | 7/1990 | Nii et al. | 384/107 |
| 4,965,476 | 10/1990 | Lin | 310/51 |
| 5,011,165 | 4/1991 | Cap | 277/80 |
| 5,013,947 | 5/1991 | Ide | 310/67 R |
| 5,140,479 | 8/1992 | Elsing et al. | 360/97.01 |
| 5,141,338 | 8/1992 | Asada et al. | 384/114 |
| 5,142,173 | 8/1992 | Konno et al. | 310/67 R |
| 5,142,174 | 8/1992 | Ide | 310/67 R |
| 5,215,385 | 6/1993 | Ide | 384/100 |
| 5,223,758 | 6/1993 | Kataoka et al. | 310/90 |
| 5,224,782 | 7/1993 | Miwa et al. | 384/100 |
| 5,246,294 | 9/1993 | Pan | 384/119 |
| 5,267,737 | 12/1993 | Cossette et al. | 277/80 |
| 5,284,391 | 2/1994 | Diel et al. | 384/108 |
| 5,328,271 | 7/1994 | Titcomb | 384/108 |
| 5,358,339 | 10/1994 | Konno et al. | 384/107 |
| 5,366,298 | 11/1994 | Toshimitsu et al. | 384/107 |
| 5,367,416 | 11/1994 | Cossette et al. | 360/97.02 |
| 5,376,850 | 12/1994 | Elsing et al. | 310/67 R |
| 5,376,851 | 12/1994 | Lipo et al. | 310/179 |
| 5,376,852 | 12/1994 | Kawamura et al. | 310/198 |
| 5,389,252 | 2/1995 | Morrick | 210/223 |
| 5,423,612 | 6/1995 | Zang et al. | 384/119 |
| 5,427,456 | 6/1995 | Hensel | 384/112 |
| 5,441,647 | 8/1995 | Wascher et al. | 210/695 |
| 5,458,785 | 10/1995 | Howe et al. | 210/695 |
| 5,465,078 | 11/1995 | Jones, Jr. | 184/6.25 |
| 5,504,637 | 4/1996 | Asada et al. | 384/107 |
| 5,524,986 | 6/1996 | Leuthold et al. | 384/107 |

MAGNETIC DISC DRIVE HAVING MAGNETIC PARTICLE TRAP FOR HYDRODYNAMIC BEARING

BACKGROUND OF THE INVENTION

The present invention relates to magnetic disc drive systems for storing information. More specifically, the present invention relates to a hydrodynamic bearing assembly which provides support and rotation for a high speed spindle element.

The predominant trend in the disc drive industry for the past several years has been to increase track density in order to achieve increased data storage capacity. One of the difficulties which must be overcome in achieving this goal is the ability to maintain tracking position accuracy as the track density increases.

A major source of tracking position inaccuracy in a computer disc drive system is spindle bearing motion which is commonly referred to as "runout". Conventional spindle bearings include ball bearing assemblies which are prone to numerous mechanical problems, such as large runout, substantial wear, capacious manufacturing requirements, and the like.

A hydrodynamic bearing is an alternative to conventional ball bearing spindle systems. In a hydrodynamic bearing assembly, a lubricating fluid functions as the actual bearing surface between a stationary base and the rotating spindle or hub. The lubricating fluid typically includes either air or liquid. The rotating hub causes the fluid to circulate through the hydrodynamic bearing. When the hub is stationary, the fluid is at rest.

Hydrodynamic bearing assemblies suffer from a number of disadvantages. For example, the parts within a hydrodynamic bearing contact each other generally along a line, whereas the parts within a ball bearing assembly contact each other along a point. During use, the stationary parts may contact the rotating hub causing wear. The wear causes undesirable metal particles to be broken away from the bearing assembly. The inner chamber carrying the fluid is sealed to prevent leakage, however, and the particles are carried in the fluid which contaminates the bearing assembly.

The particles carried in the fluid contact the bearing assembly and create additional wear and particles. Furthermore, the particles carried in the fluid can cause inefficient fluid flow. Inefficient fluid flow creates an inefficient bearing which has a shorter life. An inefficient bearing is also prone to runout which degrades motor performance.

SUMMARY OF THE INVENTION

The present invention is directed to a hydrodynamic bearing assembly for use in a magnetic disc drive system which traps particles carried therein. The magnetic disc drive system includes a disc drive chassis, a magnetic storage disc, a read/write transducer adjacent to the disc for reading and writing information on the disc, and a hydrodynamic bearing assembly. The hydrodynamic bearing assembly rotatably couples the magnetic storage disc to the disc drive chassis. The hydrodynamic bearing assembly includes a fluid path therethrough for circulating a fluid. A magnet in the fluid path attracts magnetic particles carried in the fluid.

DETAILED DESCRIPTION OF THE PREFERRED EMBODIMENTS

Figure 1:
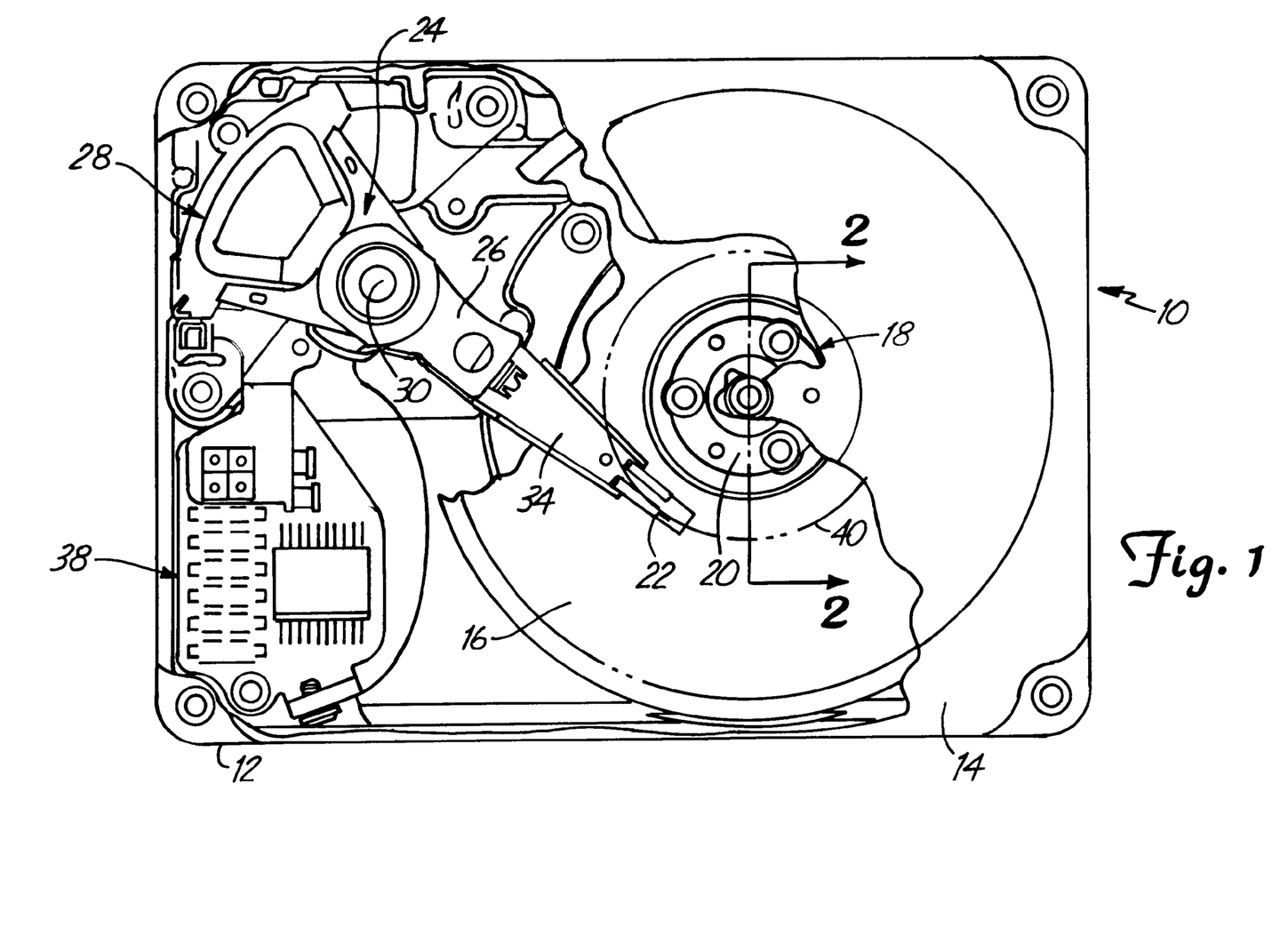
FIG. 1 is a top plan view of a magnetic disc drive including features in accordance with the present invention.

FIG. 1 shows a plan view of a disc drive 10 for use with the present invention. Disc drive 10 includes a chassis member 12 to which internal components of the disc drive 10 are mounted. Chassis member 12 couples to top cover 14 which forms a sealed environment for critical parts of the disc drive 10.

Disc drive 10 includes at least one, but typically a plurality of discs 16 which are mounted for rotation on a spindle 18 having a bearing assembly 20. The bearing assembly 20 is described in greater detail below. Typically, a plurality of magnetic read/write heads 22 are mounted to an actuator 24 having an actuator body 26 and an actuator motor 28. In the example shown at disc drive 10, actuator 24 is a rotary actuator which is mounted for pivoting about a pivot axis 30. Actuator 24 includes a number of head mounting arms 32 which couple the heads 22 to the actuator body 26 using a plurality of gimbal assemblies 34. Actuator motor 28 is also coupled to actuator body 26 to provide a force to move the heads 22 to a desired position on the surface of the disc 16.

In operation, the spindle 18 causes disc 16 to rotate. Electronic circuitry 36 energizes the actuator motor 28 causing the actuator 24 to rotate about pivot axis 30 whereby the magnetic read/write head 22 is moved through an arc radially across the surface of the disc 16. Actuator 24 positions head 22 over a concentric track, for example, track 40. This allows the electronic circuitry 36 to read back or write information at desired locations on disc 16.

Figure 2:
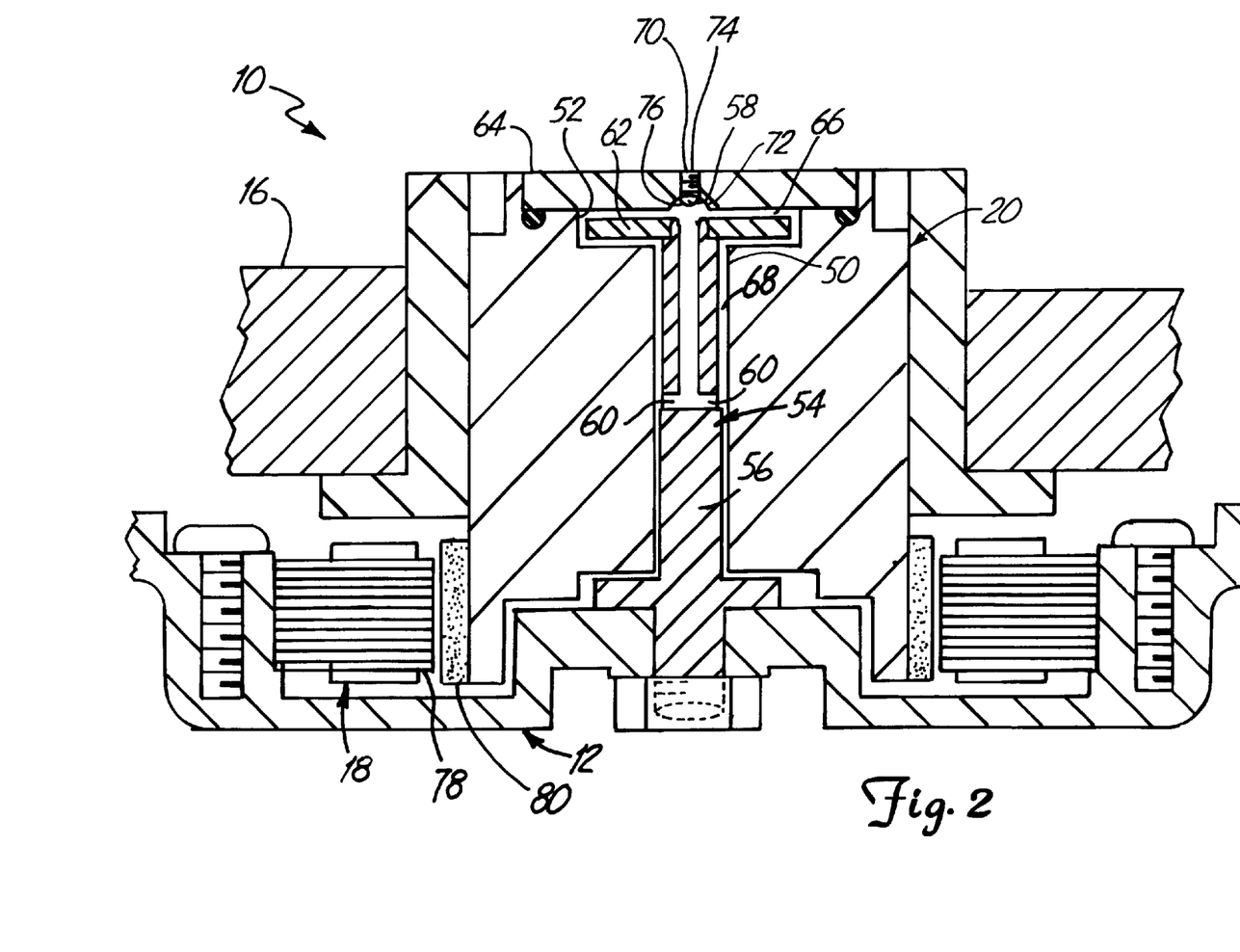
FIG. 2 is a cross-sectional view of the hub shown in FIG. 1 taken along the line labeled 2—2.

As shown in FIG. 2, the hub 20 includes a bore 50 therethrough and is typically open at one end 52. The hub 20 is rotatably coupled to a bearing assembly 54. The spindle motor 18 includes a stator assembly 78 preferably coupled to the chassis member 12 and a magnetized magnet 76 coupled to the hub 20. Interaction between the stator assembly 78 and the magnet 76 causes the hub 20 to rotate about the bearing assembly 54.

The bearing assembly 54 includes a shaft 56 connected to the chassis member 12. The shaft 56 includes a bore 58 and side openings 60. A thrust plate 62 is connected to one end of the shaft 56 to secure the hub 20 to the bearing assembly 54. A counterplate 64 is connected to the hub 20 and covers the opening 52. Preferably, the inside diameter of the bore 50 is greater than the outside diameter of the shaft 56 so as to create a chamber 66 between the shaft 56 and the hub 20. The chamber 66 is filled with a lubricating fluid 68. The fluid 68 is sealed within the chamber 66 using a barrier film (not shown).

In one embodiment, the counterplate 64 includes a tapp hole 70 and a pocket 72. A screw 74 carrying a cylindrical magnet 76 is mated with tapp hole 70 such that the magnet 76 is within the pocket 72. The pocket 72 is a portion of the chamber 66.

Figure 3:
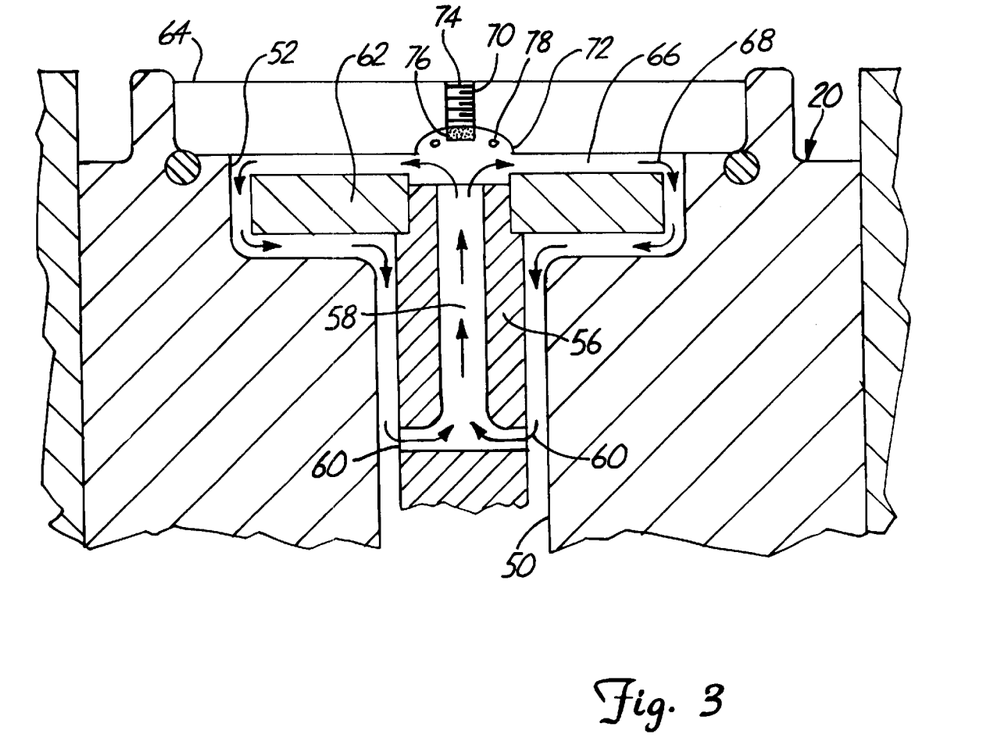
FIG. 3 is a more detailed cross-sectional view of the hub of FIG. 2.

When the hub 20 is not rotating, the fluid 68 within the chamber 66 is at rest. The counterplate 64 is in contact with the thrust plate 62 if the disc drive 10 is in the horizontal position; or the shaft 56 and thrust plate 62 are in contact with the hub 20 if the disc drive 10 is in the vertical position. When the hub 20 is rotating, pressure differentials within chamber 66 cause the fluid 68 to circulate through the chamber 66. As shown in FIG. 3, the fluid 68 circulates through the bore 58 and side openings 60 and around the shaft and thrust plate 62. When the hub is rotating the fluid 68 suspends the counterplate 64 away from the thrust plate 62 such that the hub can freely rotate about the shaft 56 and thrustplate 62.

In one embodiment, the components of the bearing assembly 54 are fabricated from series 430 stainless steel. Surface to surface contact from start-up and runout cause mechanical wear within the bearing assembly 54. Mechanical wear introduces steel particles 78 into the chamber 66. The particles 78 are carried with the fluid 68. As the fluid 68 circulates within the chamber 66, the particles 78 pass proximate the magnet 76 and pocket 72. The particles 78 are attracted to the magnet 76 and are thus trapped in the magnetic field and collected in the pocket 72.

Adjusting the position of the magnet 76 relative the chamber 66 with the screw 74 varies the magnetic field and strength of the attractive force within the chamber 66. In other words, the adjustable magnet 76 can selectively bias the hydrodynamic bearing assembly 54. The magnetic force emanating from magnet 76 becomes stronger the closer magnet 76 is positioned to shaft 56 and thrustplate 62. Additionally, the magnet 76 can be unscrewed from the counterplate to facilitate inspection of removal of the particles 78.

Figure 4:
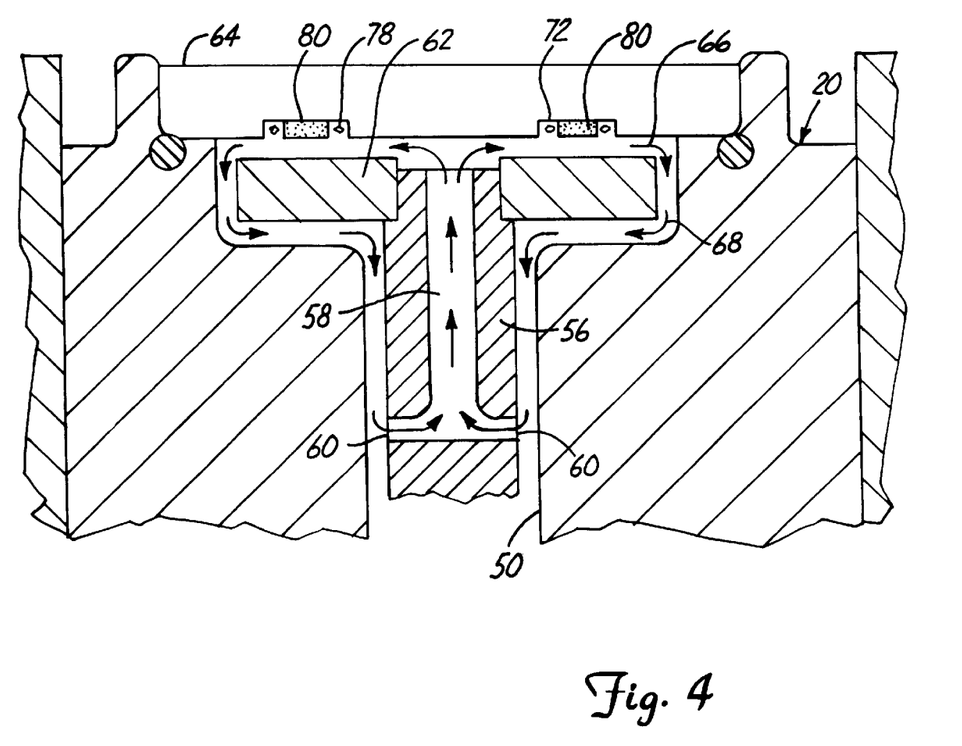
FIG. 4 is a cross-section of a hub and showing an alternative embodiment of the invention.

In another embodiment, as shown in FIG. 4, an annular magnet 80 is attached to the counterplate 64 within the chamber 66. Fluids circulating up through the shaft 56 must flow past the annular magnet 80. Thus, the particles 78 will be attracted to the magnet and trapped by the magnetic field.

Figure 5:
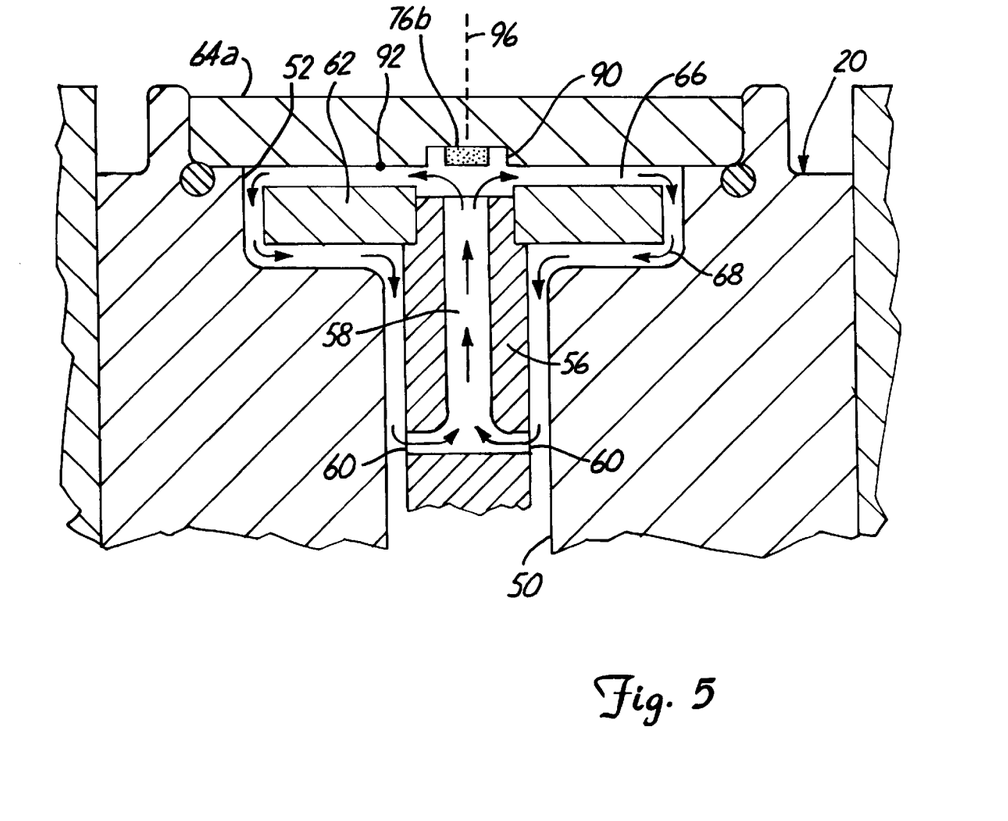
FIG. 5 is a cross-section of a hub and showing another embodiment of the invention.
Figure 5A:
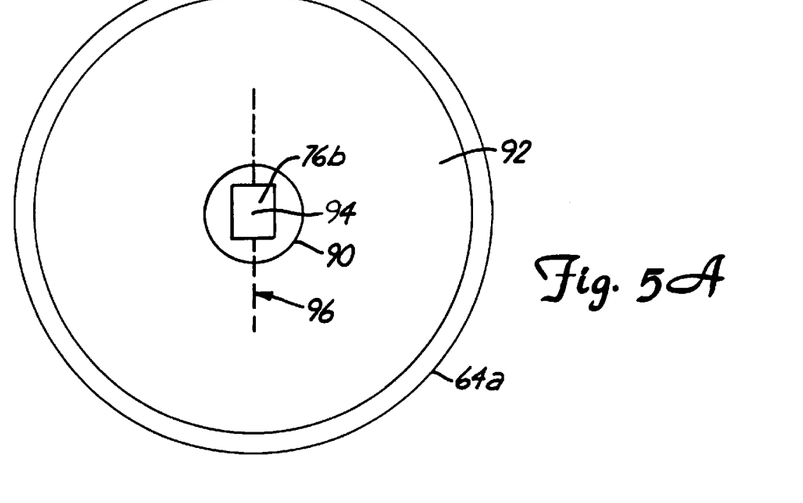
FIG. 5A is a bottom view of a portion of the embodiment shown in FIG. 5.

In another embodiment, as shown in FIG. 5, a blind hole 90 is formed In a counterplate 64a having a substantially planar surface 92. A magnet 76b is connected to the counterplate 64a and within the blind hole 90. FIG. 5A is a bottom view of counterplate 64a shown with magnet 76b placed in the blind hole 90. In this embodiment, the counterplate 64a is preferably circular having a diameter of approximately 0.669 inches. The blind hole 90 is preferably concentric with the counterplate 64a and having a diameter of approximately 0.082 inches and a depth of approximately 0.0421 inches. The magnet 76b can be made of a rare earth material such as samarium cobalt (SmCo) and is protected from corrosion with electroless nickel plating.

Figures 5B, 5C:
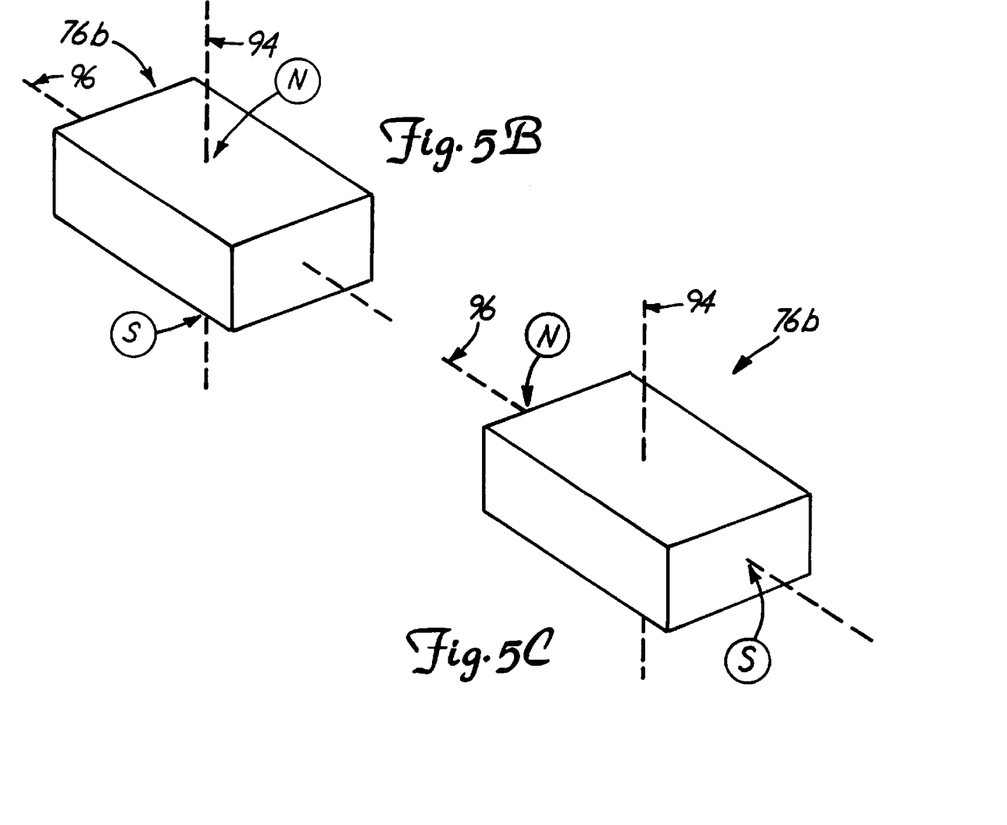
FIG. 5B is a perspective view of another portion of the embodiment shown in FIG. 5.
FIG. 5C is a perspective view of an alternative to the portion shown in FIG. 5B.

In one embodiment, magnet 76b is magnetized along axis 94 which becomes the north/south axis, as shown in FIG. 5B. In this embodiment, magnet 76b is connected to the counterplate 64a such that the north/south axis is substantially perpendicular to planar surface 92. In another embodiment magnet 76b is magnetized along axis 96 which becomes the north/south axis, as shown in FIG. 5C. In this embodiment, magnet 76b is connected to the counterplate 64a such that the north/south axis is parallel to planar surface 92.

Figure 6A:
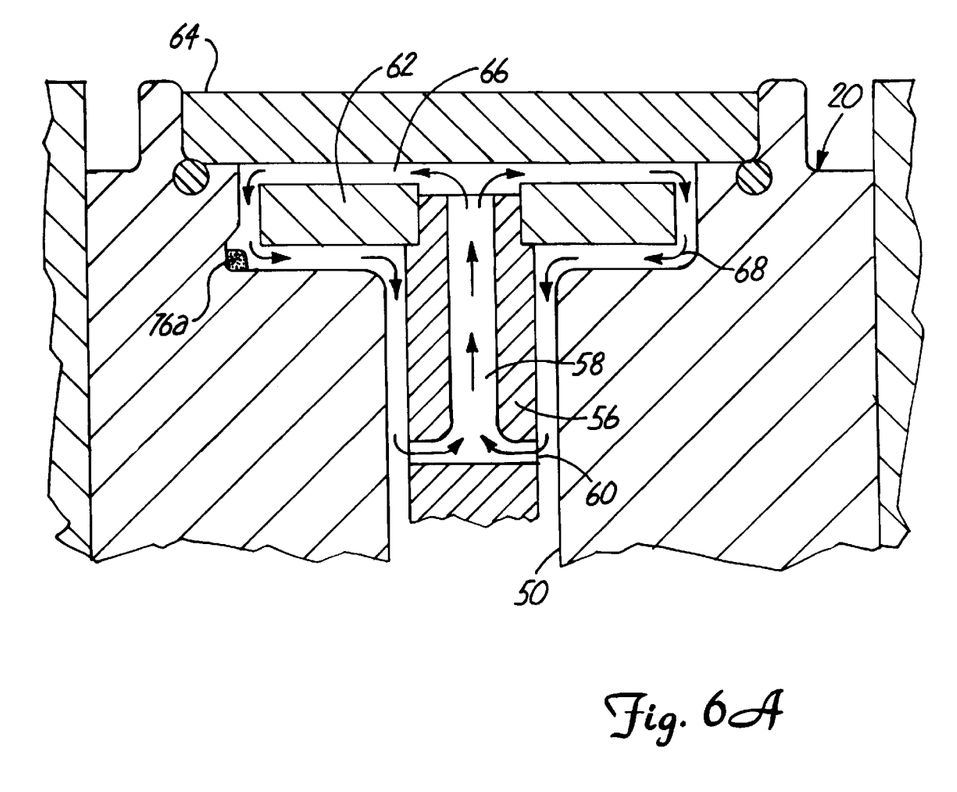
FIG. 6A is a sectional view of another embodiment of the invention.
Figure 6B:
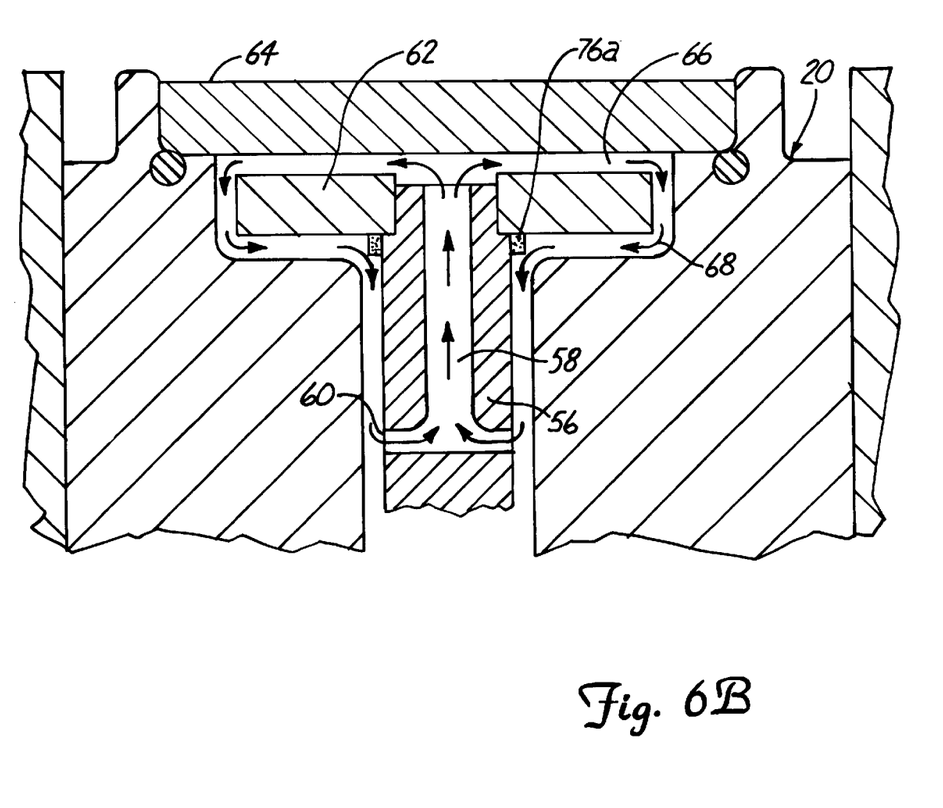
FIG. 6B is a sectional view of another embodiment of the invention.
Figure 6C:
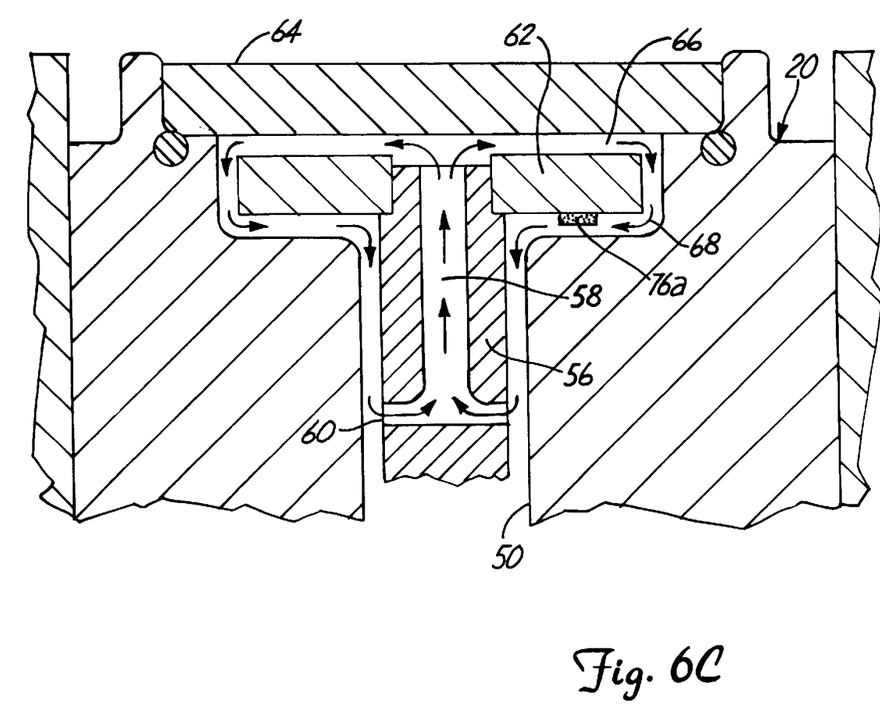
FIG. 6C is a sectional view of another embodiment of the invention.

Alternative embodiments of the present invention are contemplated, such as different types and shapes of the magnet or magnets or the depth of the pocket 72. Additionally, a magnet 76a can be positioned at any selected location within the chamber 66 such as on the hub 20, as shown in FIG. 6A; shaft 56, as shown in FIG. 6B; or thrustplate 62 as shown in FIG. 6C. Moreover, a magnet can be used without a pocket. Alternatively, a portion of the hub 20 can be magnetized to attract the particles 78 thereto. The present invention can be utilized in embodiments having a fluid filled chamber, a rotating member, and a stationary member.

Although the present invention has been described with reference to preferred embodiments, workers skilled in the art will recognize that changes may be made in form and detail without departing from the spirit and scope of the invention.

What is claimed is:

1. A magnetic disc drive system, comprising:

a disc drive chassis;

a magnetic storage disc;

a read/write transducer adjacent the disc for reading and writing information on the disc;

a hydrodynamic bearing assembly rotatably coupling the magnetic storage disc to the disc drive chassis, the hydrodynamic bearing including a fluid-filled chamber having a fluid path therethrough for circulating a fluid wherein the fluid-filled chamber includes a recess generally disposed away from the fluid path; and a magnetized magnet disposed proximate the recess in the fluid for attracting magnetic particles carried in the fluid into the recess and out of the fluid path whereby flow of the fluid through the recess is insufficient to dislodge particles from the magnet.

2. The magnetic disc drive system of claim 1 wherein the magnetized magnet is removably connected to the hydrodynamic bearing assembly.

3. The magnetic disc drive system of claim 1 wherein the magnetized magnet is annular.

4. The magnetic disc drive system of claim 1 wherein the magnetized magnet is carried on an adjustable screw positionably to bias the hydrodynamic bearing.

5. The magnetic disc drive system of claim 1:

wherein the hydrodynamic bearing includes a substantially planar counterplate; and wherein the magnetized magnet includes a north/south axis and is connected to the planar counterplate such that the north/south axis is substantially perpendicular thereto.

6. The magnetic disc drive system of claim 1:

wherein the hydrodynamic bearing includes a substantially planar counterplate; and wherein the magnetized magnet includes a north/south axis and is connected to the planar counterplate such that the north/south axis is substantially parallel thereto.

7. A bearing device in a spindle motor of a magnetic disc drive, the bearing device comprising:

a hub having a fluid path for circulating a fluid;

a shaft disposed within the fluid path;

a counterplate connected to the hub and proximate the fluid path;

a magnet disposed within the fluid path for attracting magnetic particles carried in the fluid; and wherein the counterplate includes a tapp hole and a screw mated therein, wherein the magnet is connected to the screw and wherein the magnet is positionable with the screw to bias the hub relative to the shaft.

8. The bearing device of claim 7 wherein the counterplate includes a pocket proximate the fluid path and wherein the magnet is disposed within the pocket.

9. The bearing device of claim 7 and further comprising a thrust plate connected to the shaft and within the fluid path.

10. A device for use as a hydrodynamic bearing assembly in a magnetic disc drive, the device comprising:

a stationary member;

a rotating member operably connected to the stationary member and forming a fluid-filled chamber therebetween; and a magnet disposed within the fluid-filled chamber for attracting magnetic particles within the fluid-filled chamber such that the combination of the stationary member, rotating member, and magnet acts as a hydrodynamic bearing assembly;

wherein the magnet is selectively positionable to adjust bias.

11. A magnetic disc drive system, comprising:

a disc drive chassis;

a magnetic storage disc;

a read/write transducer adjacent the disc for reading and writing information on the disc;

a hydrodynamic bearing assembly rotatably coupling the magnetic storage disc to the disc drive chassis, the hydrodynamic bearing including a fluid path therethrough for circulating a fluid; and a magnetized magnet proximate the fluid path for attracting magnetic particles carried in the fluid wherein the magnetized magnet is carried on an adjustable screw and positionable to bias the hydrodynamic bearing.

12. The magnetic disc drive system of claim 11 wherein the hydrodynamic bearing includes a fluid-filled chamber wherein the fluid-filled chamber includes a recess proximate the fluid path, and wherein the magnetized magnet is disposed in the recess.

* * * * *